United States Patent [19]

Coleman

[11] 4,232,067

[45] Nov. 4, 1980

[54] RECONSOLIDATED WOOD PRODUCT

[75] Inventor: John D. Coleman, Surrey Hills, Australia

[73] Assignee: Commonwealth Scientific and Industrial Research Organization, Campbell, Australia

[21] Appl. No.: 954,949

[22] Filed: Oct. 26, 1978

Related U.S. Application Data

[63] Continuation of Ser. No. 787,735, Apr. 15, 1977, abandoned.

[30] Foreign Application Priority Data

Apr. 15, 1976 [AU] Australia .............................. PC5622

[51] Int. Cl.[2] .......................... B05D 3/12; B27M 1/02; B27M 1/08; B32B 21/14; B32B 31/20

[52] U.S. Cl. ...................................... 428/17; 144/2 R; 144/3 R; 144/309 R; 144/309 D; 144/321; 144/327; 144/328; 156/94; 156/245; 156/256; 156/257; 156/264; 156/268; 156/296; 156/305; 156/382; 156/512; 156/517; 156/558; 427/365; 427/369; 427/397; 428/106; 428/113; 428/114; 428/151

[58] Field of Search .................... 428/528, 537, 541, 2, 428/15, 17, 105, 106, 111, 112, 113, 114, 151, 156, 163, 167, 168, 248, 249, 535; 156/6, 94, 98, 256, 257, 264, 268, 296, 305, 382, 572, 517, 558, 245; 144/2 R, 3 R, 309 R, 309 D, 321, 327, 328; 427/365, 361, 397

[56] References Cited

U.S. PATENT DOCUMENTS

| | | | |
|---|---|---|---|
| 2,817,617 | 12/1957 | Rogers | 428/528 X |
| 3,054,706 | 9/1962 | Glaubert | 428/528 |
| 3,464,881 | 9/1969 | Miller | 428/113 X |
| 3,674,219 | 7/1972 | Harvey, Jr. | 241/152 R |
| 3,927,235 | 12/1975 | Chow | 428/528 X |
| 4,061,819 | 12/1977 | Barnes | 428/294 |
| 4,112,162 | 9/1978 | Casselbrant | 428/106 |
| 4,122,236 | 10/1978 | Holman | 428/537 X |

*Primary Examiner*—James C. Cannon

*Attorney, Agent, or Firm*—Sughrue, Rothwell, Mion, Zinn and Macpeak

[57] ABSTRACT

Reconsolidated wood product and process and apparatus for forming the product, the product being formed from webs of splintered natural wood broken down by crushing or like processes, the webs being consolidated by compression and bonded with an adhesive.

26 Claims, 9 Drawing Figures

10
12
14
14a
14b
16
18
20
22
24
26
28
30
32
34
38
40
42
44
46
48
50

RECONSOLIDATED WOOD PRODUCT

This is a continuation of application Ser. No. 787,735, filed Apr. 15, 1977, now abandoned.

This invention relates to a reconsolidated wood product.

Reconstituted wood products, such as "particle boards" formed by binding small wood flakes with adhesive, are well known and in wide-spread use in furniture and other consumer products. Such materials are normally available in the form of sheets only since, in general, they exhibit poor ability to sustain bending loads, as compared with natural timber, and are thus largely unsatisfactory as structural beams. In this respect, natural timber exhibits directional mechanical properties, owing to the natural alignment of wood fibres along the direction of extent of the tree trunk, tensile strength and elastic modulus, for example, being much greater in directions parallel to the grain direction than normal thereto. On the other hand, the random alignment of wood flakes in particle boards and like reconstituted wood products results in substantially isotropic mechanical properties, these properties, further, being generally analogous to the relatively poor mechanical properties possessed by wood in directions normal to the grain. Attempts have been made to produce reconstituted wood products in which preformed wood flakes are oriented in a single direction, in order to provide a structure more akin to natural wood, and such products do possess directional strength characteristics, exhibiting relatively improved strength in directions parallel to the direction of alignment. For example, Canadian patent specification No. 966,409 (MacMillan Bloedell Limited) discloses a method of making a board product from aligned but discrete wood strands or fibres. The strands or fibres are produced by breaking down timber by slicing, crushing, shaving, peeling or the like. When the fibres are combined to form a board (by the use of a suitable adhesive) it is necessary to physically orient them in side-by-side disposition. Similarly, in U.S. Pat. No. 3,674,219 (Herbert C. Harvey, Jr., assigned to Tennessee Valley Authority) wood is broken into splinter products in the form of a spongy mass of loosely matted fibre strands. This mass of strands is then scrubbed to produce discrete fibres which are subsequently formed into board products by known techniques. The alignment of preformed wood flakes is a difficult operation so that manufacturing processes for such products tend to be relatively complex and the strength of materials produced this way still tends to be somewhat less than that of natural timber.

According to this invention there is provided a reconsolidated wood product including numerous wood splinters a substantial proportion of which are substantially separately defined but non-discrete the splinters being bonded together. Preferably, said substantial proportion of splinters comprises a matrix of generally aligned splinters. The bonding may be effected by use of a suitable bonding agent or alternatively the splinters may be treated with a suitable material, such as ammonia to render plastic the outer surfaces of the splinters whereby they can be bonded by application of pressure thereto. Preferably, the matrix is formed from at least one web of said splinters, which web has been consolidated by compression. The web is preferably obtained by breaking down natural wood, the breaking down not being carried to an extent beyond which said substantial proportion of said splinters remain maintained at least partly interconnected and substantially aligned in the initial grain direction of the natural wood. The breaking down may be effected by rendering the natural wood such as in a crushing process. The matrix may be formed from a plurality of the said webs and there may, for example, be a plurality of local volumes within the product each with a said matrix embedded in set bonding agent, the splinters in at least two of these local volumes being aligned in different directions. Thus, the local volumes may comprise overlying laminations.

The product may have a surface portion at which the said splinters are aligned in one direction, this surface portion having therein a plurality of indentations, which indentations are elongate in said direction and have opposed sides which extend in said direction and which, where they meet the surface portion, define respective lines which diverge from generally pointed ends of the respective indentations towards respective wider intermediate portions of the indentations.

The invention also provides reconsolidated wood product including numerous wood splinters a substantial proportion of which are aligned in one direction and form a matrix of said splinters, the splinters being bonded together; said product having a surface portion at which the splinters of the product are substantially aligned in said one direction, this surface portion having therein a plurality of indentations, which indentations are elongate in said one direction and have opposed sides which extend in said one direction and which, where they meet the surface portion, define respective lines which diverge from generally pointed ends of the respective indentations towards respective wider intermediate portions of the indentations.

The invention further provides a process for forming a reconsolidated wood product comprising rendering natural wood to form splinters a substantial proportion of which are substantially separately defined but non-discrete and bonding said splinters together, for example by use of a bonding agent applied either during said rendering or thereafter or by suitable surface treatment of the splinters as mentioned previously. Preferably said rendering is effected such that said substantial proportion of splinters comprises a matrix of substantially aligned splinters. The matrix preferably comprises a web of said splinters the substantial proportion of the said splinters being maintained oriented in the direction of the grain of the natural wood. The web is preferably formed by breaking down said natural wood; preferably the breaking down is carried out only to an extent such as to form the said splinters without effecting complete separation of said substantial proportion of said splinters, and preferably without substantially damaging the essential structure of the wood forming the splinters. The breaking down is preferably performed by applying force to said natural wood such as by rolling it or repeatedly piercing it at intervals along its length. The wood may be harvested or processed into portions of high aspect ratio before breaking down is effected. Rolling of the wood may be carried out by passing it past a roller having a smooth or contoured cylindrical outer surface, or between pairs of such rollers, or each roller may have a textured, serrated or toothed outer surface designed, for example, to produce areas of weakness at predetermined distances along the length of the natural wood as it is passed therethrough and to facilitate passage of the wood through the rollers. If each roller is toothed it is preferred that there be a plurality of circumferential sets of teeth spaced along the length thereof with teeth of adjacent sets pitched such as to be out of phase one relative to the other. Preferably the natural wood is passed through successive roller pairs to induce progressive splintering at each pass. The pairs of rollers may be arranged such that alternate ones thereof have the nips thereof contained in a plane spaced from a plane containing the nips of the other pairs thereof or be otherwise arranged so that the natural wood passing therethrough is conformed to a serpentine configuration to assist in inducing flexibility into the resultant web. The axes of successive roller pairs may also be angularly displaced by 90° each relative to the next. Differential speeds may be established between successive rolls to stimulate splitting. Breaking down may be effected, alternatively, by inducing torsion into a length of said natural wood, or such torsion may be induced merely to assist the breaking down, for example prior to passage of the wood through a roller pair. A predetermined pattern of grooves may be impressed on a leading end of a billet of the natural wood before application of breaking down forces thereto, in order to effect initiation of cracking of the billet along desired planes. Alternative processes, such as impacting with hammers or the like or striking and piercing parallel to the grain, repeatedly, at intervals along the wood length may also be employed to break down the natural wood. Preferably the said web is consolidated by compression to form the matrix prior to the said bonding and this may be effected, for example, by passing the web through a pair of rollers or compressing bands or by loading it into a mould and applying pressure thereto. The said bonding agent may, if a mould is employed, be introduced into the mould, such as in foam form, prior to insertion of the web thereinto, or alternatively the bonding agent may be sprayed or otherwise applied onto the web, either during or after formation thereof, this latter step being applicable also where compression of the web is effected by use of rollers. Preferably however the bonding agent is applied by dipping the webs into a bath of the bonding agent in liquid form. Normally drying of the wood is effected before bonding agent is applied thereto and this is normally essential where green timber is employed. A number of the said webs may be combined to form the aforementioned matrix and a number of matrices may be combined to form the said wood product. In the latter case, the directions of alignment of the splinters in adjacent matrices may be non-parallel. The texture of the layers may be varied and/or zones of unaligned wood particles may be introduced. Other reinforcing materials such as wire mesh may also be introduced. Prior to the step of breaking down the said natural wood, steaming may be effected to facilitate breaking down, and heating of the web after application of the bonding agent may be effected in order to ensure proper curing of the bonding agent. Preferably the process of the invention is carried out whilst maintaining the splinters as produced in a constant alignment, such as in the direction of passage through the processing equipment.

The invention further includes apparatus for producing a reconsolidated wood product comprising first means for rendering natural wood to form numerous splinters of natural wood, a substantial proportion of which splinters are substantially separate but non-discrete and second means for bonding said splinters together. The first means preferably comprises at least one pair of crushing rollers for crushing the natural wood to form a web of said splinters, the said substantial proportion of said splinters remaining aligned in the direction of the grain of said natural wood, together with means for compressing said web. The means for compressing the web may comprises presser rollers and tracks together with a suitable means for passing the web through these. The latter means may also include means for combining together a plurality of said webs for then passing these through the presser rollers together. The first means may also include means for applying torsion to the natural wood before passing it through the said crushing rollers. Means may also be provided for applying a predetermined groove pattern to the end of the natural wood to facilitate cracking along predetermined planes. The said means for compressing the said web may also comprise a mould, means for feeding the said web into the mould whilst maintaining alignment thereof and means for pressing the web into the mould. A continuous belt press type moulding device may also be employed for the compression. Heating means may be provided for curing the bonding agent, and steam treatment means may be provided for subjecting the natural wood to steaming prior to being passed to the said first means.

The invention is further described with reference to the accompanying drawings, in which.

Figures 1, 2, 3, 4, 5:
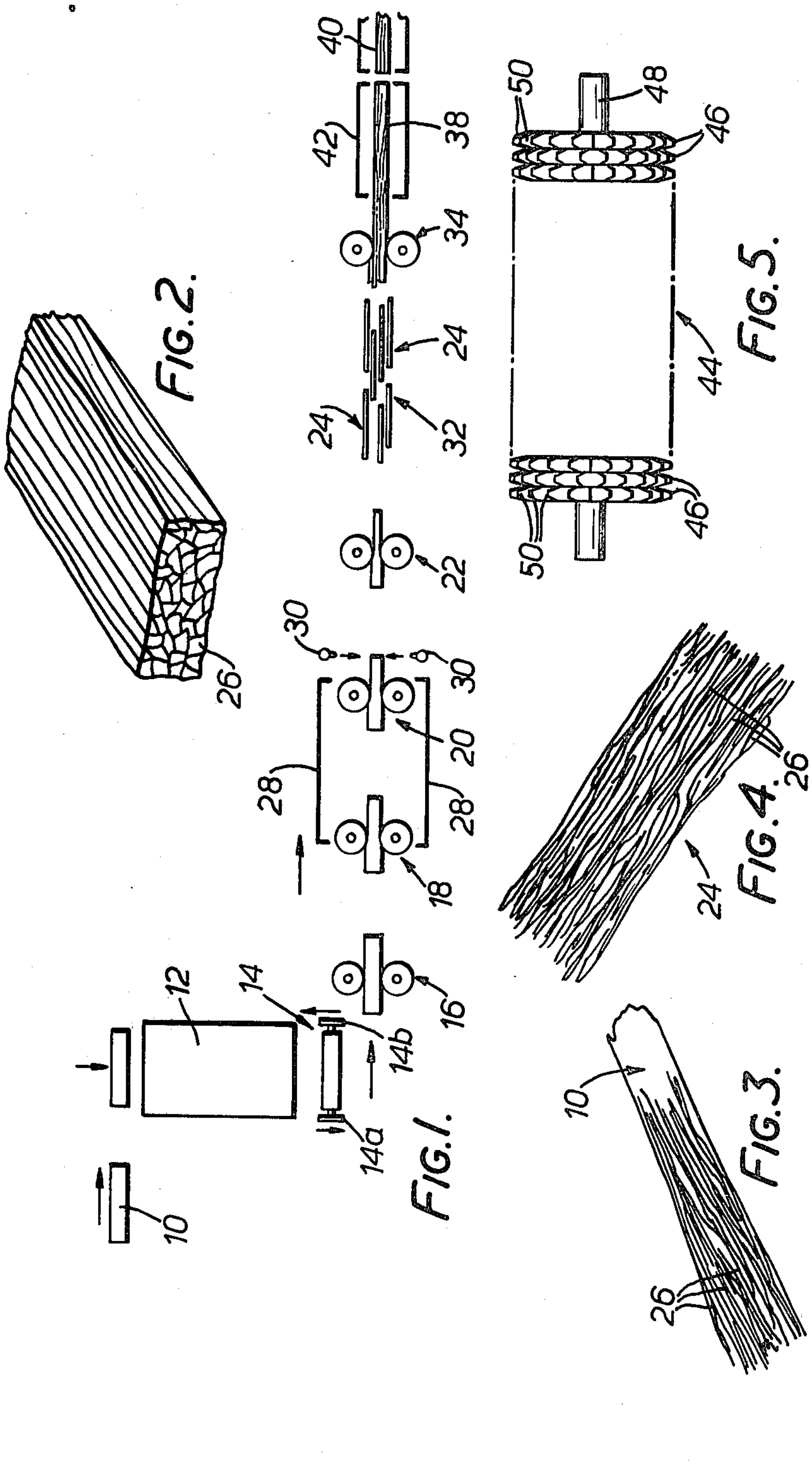
FIG. 1 is a diagram illustrating an apparatus and method for forming a reconsolidated wood product in accordance with the invention.
FIG. 2 is a fragmentary perspective view of a reconsolidated wood product formed in accordance with the invention.
FIG. 3 is a perspective view of a timber billet which has been partially processed by the method illustrated in FIG. 1.
FIG. 4 is a perspective view of a portion of a web produced by crushing a timber billet and ready for combining to form the product of FIG. 2.
FIG. 5 is a side view of an alternative form of roller usable in the apparatus of FIG. 1.
Figure 6:
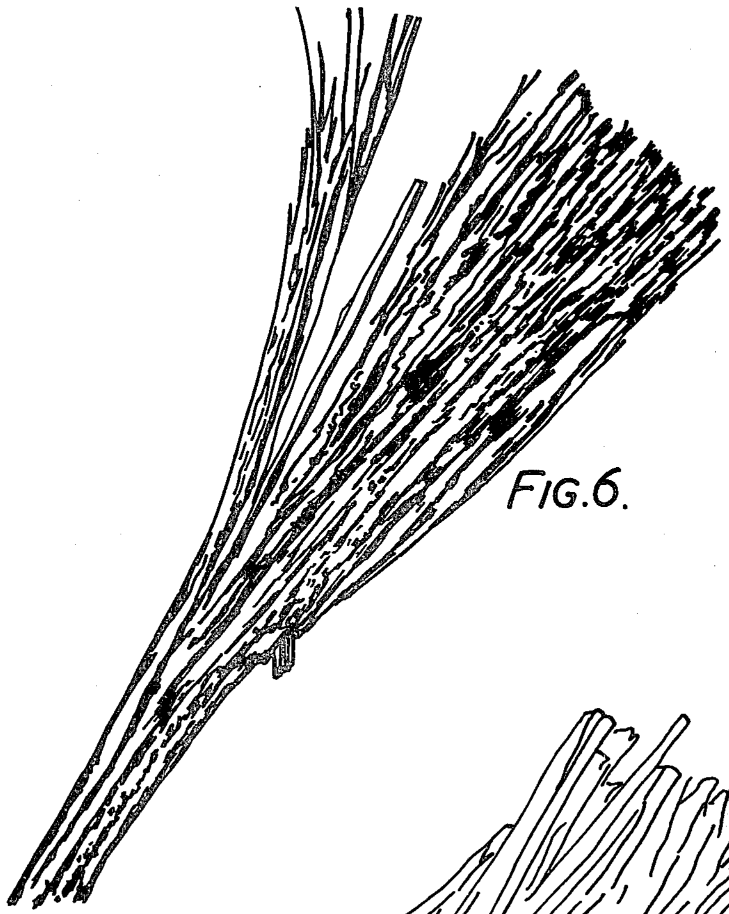
FIG. 6 is a perspective view of a portion of a web like the web of FIG. 4 but shown in greater detail.

In the apparatus of FIG. 1, milled timber billets 10 are steamed in a steaming chamber 12 and then subjected to initial cracking by twisting the billets axially at a torsion station 14. The billets are each milled with the wood grain direction extending lengthwise thereof and twisting of the billets at station 14 is effected by engaging the opposite ends with engaging members 14*a*, 14*b* which members are then turned one relative to the other. After this initial twisting and resultant cracking, the billets are passed through a succession of pairs of rollers 16, 18, 20, 22. At each pair of rollers, the billets are fractured along numerous longitudinal crack lines so that the final product emerging from rollers 22 is, as shown in FIGS. 4 and 6, a somewhat flexible web 24 comprised of numerous wood splinters 26 which are still loosely interconnected to form a continuous flexible "fabric", alignment of the splinters being maintained in a convenient manner, the splinters preserving the original orientation of the grain of the billets. As the billets pass between rollers 18 and 20, they are subjected to predrying by means of heaters 28 and as they pass between rollers 20 and 22 adhesive is sprayed thereon via spray nozzle 30. FIG. 3 shows a partially broken down billet 10 as this would appear when partway through the first pair of rollers 16. It will be seen that, already, at the part which has passed through the rollers 16, the billet is broken down to form splinters 26, although these may be of larger size than is desired for the final splinters in the web 24. Thus, by the stage of breaking down at which the billets emerge from rollers 20, the splinters 26 are well defined so that the adhesive, as sprayed from nozzle 30, will penetrate well into the web 24. Compression applied via the rollers 22 assists in distributing the adhesive evenly through the webs.

A succession of webs 24 leaving rollers 22 are combined together at a combining station 32. In this instance, the webs are combined by laying them one over the other and, if desired, in overlapping side by side disposition also to make up any desired width and structure of final product. After combining, the desired number of overlaid webs 24 is then passed through compressing rollers 34 to compress the webs 24 so that the individual splinters 26 form a compacted matrix structure 38. This is then passed through a heating and pressing station 42 to cure the adhesive and produce the final product 40. The product 40 is held between opposed heated pressing plates at station 42 to effect curing. These steps can be effected by use of well known apparatus of the type customarily employed for making particle board and is therefore not described in detail. As shown in FIG. 2, the product 40 is characterized by consisting of numerous splinters 26, which splinters are held together by the adhesive in a compacted matrix. It has been found that, even with moderate pressure applied at the pressing station 42, it is possible to achieve a relatively smooth exterior surface on the final product with relatively few voids, either in the surface or within the product.

Figure 7:
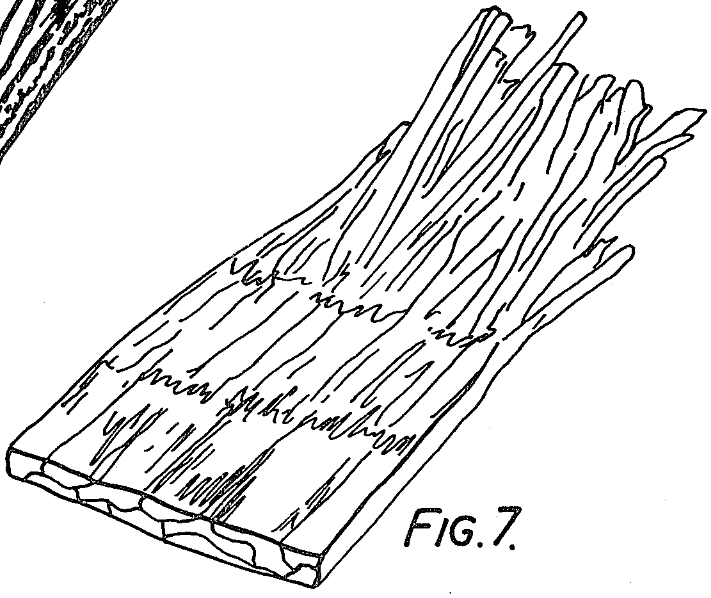
FIG. 7 is a perspective view of a portion of a web like that of FIG. 4 but shown in greater detail, part thereof being processed to a form like that illustrated in FIG. 2.

In FIG. 7 a web 24 has been processed at one end only to the stage of formation of the splinters 26, and at the other end fully processed to the stage represented in FIG. 2, part of the latter end being cut away to show the final structure.

The rollers 16, 18, 20, 22 may be smooth surfaced, or contoured or may have projections therefrom to bruise the splinters 26 at spaced locations along the length thereof whereby to make the resultant web 24 more flexible and conformable after drying. FIG. 5 shows a roller 44 made up of a plurality of sprocket wheels 46 positioned side by side on an axle 48, teeth 50 of each sprocket wheel being "out of phase" with those of the adjacent sprocket wheel(s). Rollers of this form have been found to produce very satisfactory webs, provided the pitch of teeth 50 is not such as to allow segments of splintered wood produced between adjacent teeth from pulling out of the final product when the product is subjected to tensile stress causing premature non-composite mode failure.

Figure 8:
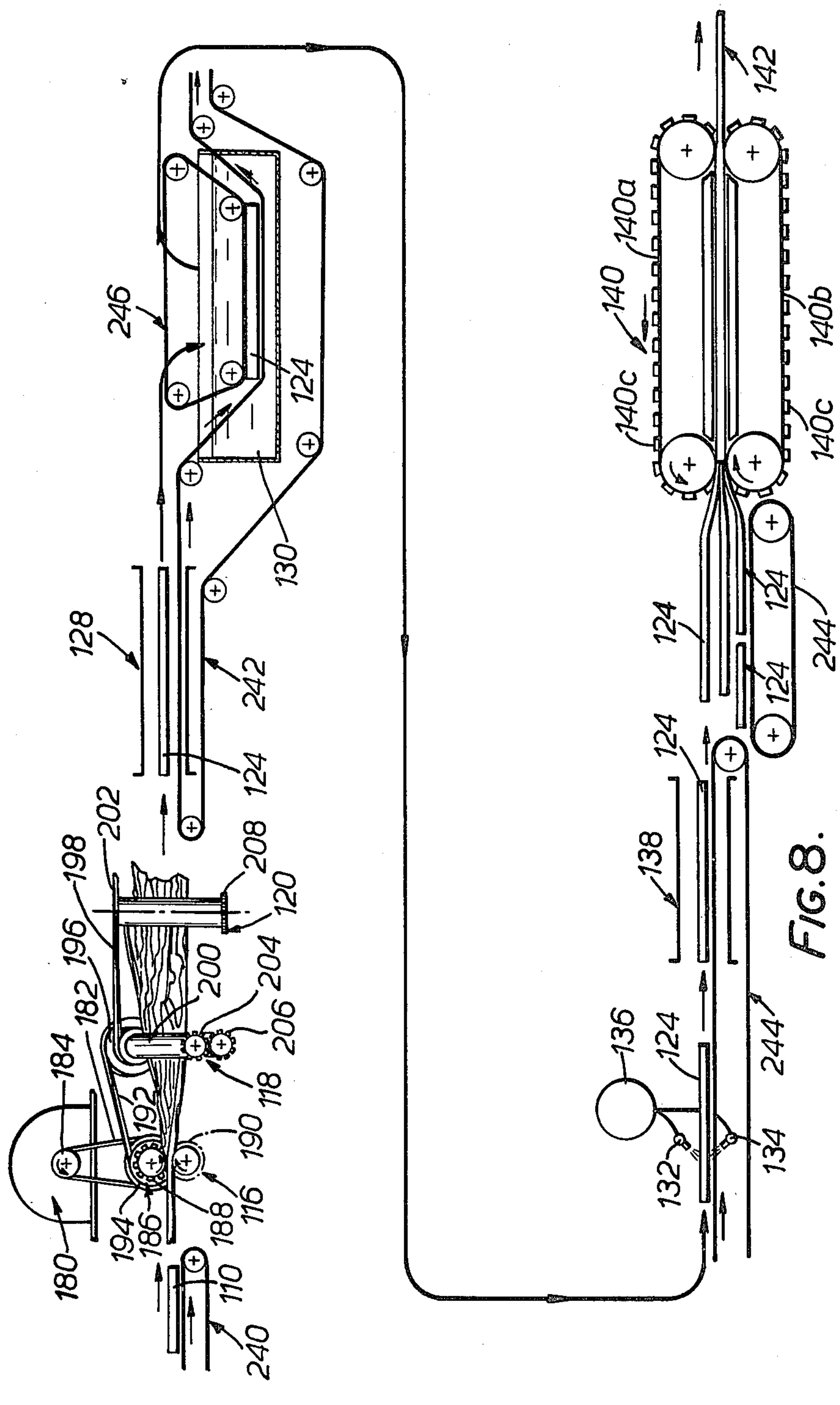
FIG. 8 is a diagram illustrating an alternative apparatus and method for forming a reconsolidated wood product in accordance with the invention.

In the apparatus of FIG. 8 slender natural wood stems 110 are passed through a succession of roller pairs 116, 118, 120. At each roller pair the billets are fractured along numerous longitudinal crack lines so that the final product emerging from the roller pair 120 is a web 124 like the web 24 previously described. The roller pair 116 is driven from a motor 180 via a belt 182 and interconnecting pulleys 184, 186, which pulleys are respectively on the motor shaft and a drive roller of pair 116. The rollers of pair 116 are interconnected by respective meshing coaxial gears 188, 190 attached to these rollers, for synchronous driving thereof. A drive roller of roller pair 18 is driven from an endless belt 192 interconnecting two pulleys 194, 196 respectively on drive rollers of pairs 116, 118, whilst, similarly, a drive roller of pair 120 is driven from an endless belt 198 interconnecting pulleys 200, 202 on drive rollers of the respective pairs of rollers 118, 120. Rollers of pair 118 are synchronously driven via respective meshing coaxial gears 204, 206 thereon and rollers of pair 120 are synchronously driven by respective coaxial gears thereon, only one of which gears, designated by numeral 208, is visible in FIG. 8.

The diameter of pulley 194 is smaller than that of pulley 196 and that of pulley 200 is smaller than that of pulley 202. Thus, when motor 180 is operated, rollers of pair 116 are synchronously rotated at a speed greater than that of the synchronous rotational speed of rollers of pair 118, whilst the rollers of pair 120 are synchronously rotated at a lower speed than those of pair 118. It has been found that the progressively decreasing speeds of rotation of rollers of the roller pairs 116, 118, 120 so produced induces an effective crushing action on the wood stems 110. The axes of rollers of pair 116 are horizontal, whilst those of the rollers of pair 118 are at an inclined angle to the horizontal, and those of the rollers of pair 120 are vertical. It has been found that this progressive relative angular displacement of these axes as viewed in the direction of travel through the roller pairs also assists in the crushing action.

Figure 9:
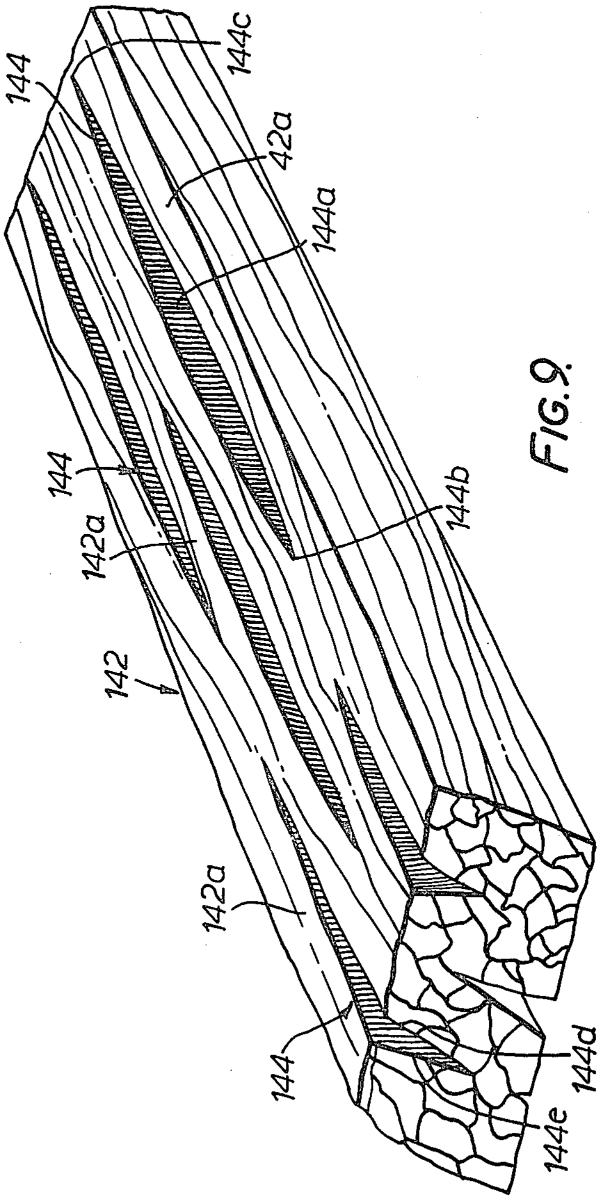
FIG. 9 is a perspective view of a reconsolidated wood product formed by the apparatus and process of FIG. 8.

After removal from roller pair 120, webs 124 are successively advanced through the remainder of the apparatus by conveyors 242, 244. First, the webs are passed through a pre-drying station 128. Pre-drying at this station may be carried out, such as by the use of heaters, for a period of between 10 to 30 minutes at about 100° C. After passage through pre-drying station 128, webs 124 are cooled and then dipped in liquid resin composition, contained in a bath 130. Typically, the bath may contain 5 to 35% resin solids and immersion carried out for between 5 and 20 seconds. After removal from bath 130 the webs 124, properly held and supported by the conveyors are subjected to air blasts from nozzles of air doctors 132, 134 to upper and lower faces thereof, these being supplied from a sorce 136 of pressurized air. The air blasts remove excess liquid which can be retained for re-use. The webs 124 are then passed to a post evaporation station 138 where evaporation of excess moisture is effected. Typically, the webs may be subjected, at station 138, to a temperature of 35° C. for 5 to 20 minutes. A warm air current may be used to accelerate this process. Webs 124 are then overlaid to make up a desired thickness and passed to a belt press 140 of a type customarily employed for manufacture of particle board products. This includes two endless belts 140*a*, 140*b* having opposed inner runs which extend in closely spaced parallel relationship and between which the consolidated webs 124 are compressed so that the final product 142 (shown in detail in FIG. 9) emerges therefrom, this being generally in the form of the product 40 previously described. Heat may be applied during passage of the webs through the press 140 to facilitate curing of the resin.

The endless belts 140*a*, 140*b* carry projections 140*c* which are arranged to press into the webs 124 passing through press 140 to form indentations 144 which appear in the corresponding final product 142. It will be understood that similar indentations may likewise be provided in product 40 produced by the apparatus of FIG. 1, such as by providing projections like projections 140*c* on the pressing plates at pressing station 42.

The indentations 144 are elongate, extending in the direction of alignment of the splinters making up the product 142. The indentations are each of wedge shaped transverse section with inwardly convergent side walls 144*d*, 144*e*. Each indentation also tapers, in the lengthwise direction, from an intermediate portion 144*a* thereof towards opposite pointed ends 144*b*, 144*c*. The indentations 144 are arranged in a regular array on each of two opposed faces of the product 142 the indentations being at regular pitch spacings in parallel rows running in the direction of the grain of the product. Alternate rows have indentations which are displaced one half a pitch distance, in the direction of extent of the rows, from indentations in the intervening rows. The indentation patterns on each face of product 142 are the same with the rows on one face overlying respective rows on the other face. However, indentations in each pair of so overlying rows are displaced apart relative to each other by one half of the pitch distance. The indentations are preferably of maximum depth at the intermediate portions thereof, becoming shallower towards the opposed ends 144*b*, 144*c*.

The projections 140*c* may conveniently be formed by cutting chords from disc shaped members which disc shaped members are circular and taper in thickness from a central portion towards a thin peripheral edge, so that the indentations 144 are similarly of complementary configuration to such chords. The indentations may extend, as shown, to a depth of about ⅔ the thickness of the product 142 or may even extend completely through the product.

The pattern of the indentations on each face of the product 142 is such as to form therebetween a plurality of sinuous lengthwise extending upstanding portions 142*a* on the corresponding faces. It has been found that this assists in ensuring stability of the product under varying ambient conditions, as well as increasing the total surface area of splinters which is bonded and inducing properties which are more closely allied to those of the parent natural wood. It will be appreciated also that the indentations reduce the average distance over which heat must travel from the exterior of the product to the interior thereof during curing of the bonding agent. Again, the use of projections 140*c* facilitates local consolidation of the webs 24 or 124 into a 3-dimensional lattice work at the locations where these engage the webs. This minimizes the need to ensure very even positioning of the webs during consolidation. The average density of the product and weight/stiffness ratio are also reduced, thereby increasing the effective yield from wood forrests supplying raw material for the product.

The indentations 144 may also advantageously be provided in the surface of a reconsolidated wood product even if not produced in accordance with the process described with reference to FIGS. 1 and 8. Particularly any reconsolidated wood product formed from bound together aligned wood splinters may advantageously employ such indentations.

Wood products formed in accordance with the invention and from poplar have been found to exhibit strength of the order of eight times that of ordinary pinus radiata particle boards, when measured in directions transverse to the direction of splinters 26. Samples from pinus radiata wood have been found to possess about two thirds the strength of selected grade natural wood and fail structurally in a true composite mode, much as does natural wood, under load tests; that is to say failure is by structural failure of the wood splinters rather than by failure of the bonding agent. It is believed that this arises because of the directional alignment of the splinters and furthermore because the splinters, individually, exhibit a wood structure which approaches that of natural timber. Because of this, products formed in accordance with the invention possess good machinability, and can retain nails, screws or other fastenings much more effectively than conventional particle boards. The product can be manufactured from a wide variety of timbers including poplar, pinus radiata and Australian native species such as eucalyptus and acacia, e.g. *E. Viminallis* and *A. Dealbata.*

The product of the invention can be manufactured from mature trees, or preferably from thin young coppiced wood alike, affording great flexibility in selecting raw materials. The ability to use young stock allows afforested areas to be brought into production much sooner than is otherwise possible for producing structural wood products. The product is more homogenous than natural wood and engineering safety factors may be lower. Processing steps and/or wood species may be selected to give a wide variety of splinter sizes. For example, in experiments, splinters or strands of poplar ranging in cross sectional area from about 1 to 100 square millimeters have been found to provide satisfactory end products. Thicker splinters may, however, be employed provided satisfactory contact between splinters to give adequate adhesion is obtained. The adhesive used may, for example, comprise urea formaldehyde, although other resins may be utilized. Foaming techniques may be applied to foam the resin to assist in spreading the resin and to fill any voids which might occur between the splinters. It is, of course, possible to combine the webs 24 in ways other than that described, such as by arranging them in layers with adjacent layers having "grain" directions angularly disposed one relative to the other. Although the described product is in the form of a board, the techniques herein disclosed can, of course, be applied to manufacture a wide variety of cross-section of wood product, including for example "I" beams or other sections. These need not be linear, and may, for example be curved.

Although the described product is formed by use of an adhesive to bond the splinters, this is not essential as it is possible to bond the splinters by use of a suitable surface treating agent such as ammonia which when applied to the splinters plasticizes the surfaces thereof permitting the splinters to be bonded by application of pressure thereto to merge the surfaces.

Whilst the described breaking down of billets 10 and 110 involves the use of rollers other devices, such as repeatedly striking or piercing the billets at intervals along the length thereof may be employed, or both rolling the striking and piercing may be together employed.

The described indentations 144, where provided in a product 142 or 40 may be varied. For example, indentations may be provided on only one face or on all faces of the product and may be of different shapes to those described. The process of the invention has the particular advantage that it readily enables the natural wood used to be processed without taking special precautions to ensure that the splinters produced during processing are maintained aligned. For example, in the apparatus shown in FIG. 9, the parent wood and the webs 124 produced therefrom are easily transported through the apparatus by conveyors 240, 242, 244 these naturally maintaining splinter orientation, an additional conveyor 246 running above conveyor 242, positioned to prevent webs floating within bath 124, being the only additional transport mechanism necessary.

EXAMPLE

Freshly harvested *Acacia Dealbata* was passed repeatedly through a pair of rollers, the spacing between the rollers being progressively decreased until a flexible web of the wood was produced. The rollers were driven with a peripheral speed of about 40 feet/minute. The web was dried to oven dryness in an oven, drying being carried out for 20 minutes at 100° C. The web was then immersed for 5 seconds in a resin bath made up of 25% urea formaldehyde solids. Surplus resin liquid was then blown off thoroughly with compressed air. The thus resinated web was then dried at 35°–40° C. for about 20 minutes, during which time the resin concentration on the web strands was raised to about 40%. The web was then pressed in a mould, between steam heated platens at a temperature of about 120° C. for 20 minutes, with an applied pressure of about 400 p.s.i. The final product was a matrix of aligned splinters, bonded with the adhesive.

The described constructions have been advanced merely by way of explanation and many modifications may be made thereto without departing from the spirit and scope of the invention as defined in the appended claims.

I claim:

1. Reconsolidated wood product including at least one flexible open lattice work web of naturally interconnected wood strands, said strands extending substantially parallel to each other in the direction of the grain of the natural wood and a bonding agent bonding together said strands which have been consolidated to substantially their original orientation.

2. Reconsolidated wood products as claimed in claim 1, wherein said wood product is formed from a plurality of said webs.

3. Reconsolidated wood product as claimed in claim 1, wherein there are defined, within the product, a plurality of bonded together local volumes, each volume having at least one of said webs bonded by said bonding agent, the strands within each local volume being generally aligned in the same direction and the strands in at least two of these local volumes being aligned in different directions.

4. Reconsolidated wood product as claimed in claim 3, wherein said local volumes are formed by respective overlying laminations, each lamination comprising one or more said webs.

5. Reconsolidated wood product as claimed in claim 1, having a surface portion at which the said strands are aligned in one direction, said surface portion having therein a plurality of indentations substantially between said strands, which indentations are elongate in said direction and have opposed sides which extend in said direction and which, where they meet the surface portion, define respective lines which diverge from generally pointed ends of the respective indentations towards respective wider intermediate portions of the indentations.

6. Reconsolidated wood product as claimed in claim 5, wherein said product is planar with a separate said surface portion defining each opposed major face of the product, the said direction being the same at each said opposed surface portion and said indentations being on each opposed said surface portion, and not opposed to one another.

7. Reconsolidated wood product as claimed in claim 6, wherein each said indentation varies in depth from a maximum depth at said intermediate portion thereof to a minimum depth towards each said end thereof.

8. Process for forming a reconsolidated wood product consisting substantially of the steps of rending natural wood to form a flexible open lattice work web of substantially parallel aligned, naturally interconnected strands, compressing the web to consolidate the strands and bonding said strands together.

9. Process as claimed in claim 8, wherein said rending is effected by subjecting the natural wood to pressure by roller means.

10. Process as claimed in claim 9, wherein said rending is carried out by engaging the natural wood with a roller having a smooth cylindrical outer surface.

11. Process as claimed in claim 9, wherein said rending is carried out by engaging the natural wood with a roller having a textured outer surface.

12. Process as claimed in claim 9, wherein said rending is effected by passing the natural wood successively through successive cooperating roller pairs to produce progressively increased splintering at each pair.

13. Process as claimed in claim 12, wherein nips of said roller pairs are non-parallel when viewed in the direction of travel of the natural wood therethrough.

14. Process as claimed in claim 9, wherein said roller pairs are driven such that the peripheral speeds of the rollers of the roller pairs are not the same for all roller pairs.

15. Process as claimed in claim 8, wherein said rending is effected or assisted by subjecting a length of said natural wood to torsional stress by counter rotating the opposite ends of said length.

16. Process as claimed in claim 8, wherein said rending is effected or assisted by repeatedly impacting or piercing said natural wood, at spaced locations along the length thereof.

17. Process as claimed in claim 8, wherein said compression is effect by passing the web through presser rolls or between a pair of belts driven to engage the web from opposed sides and to move the web through the pair of belts.

18. Process as claimed in claim 8, wherein said compression is effected by loading said web into a mould and applying pressure thereto.

19. Process as claimed in claim 8, wherein said bonding is effected by use of a bonding agent added to said web.

20. Process as claimed in claim 18, wherein bonding agent to effect said bonding is introduced into said mould prior to said compression within the mould.

21. Process as claimed in claim 17, wherein bonding agent to effect said bonding is applied to said web prior to said compression by dipping it into a bath of said bonding agent in liquid form.

22. Process as claimed in claim 21, wherein excess liquid is removed after said dipping and prior to said compression by subjecting it to an air blast.

23. Process as claimed in claim 22, wherein the web is dried before dipping and subjected to a warm environment to allow evaporation of moisture therefrom after dipping.

24. Process as claimed in claim 8, wherein indentations are formed into the consolidated web during said compression thereof and prior to completion of the bonding, said indentations being aligned with the direction of lengthwise extent of the wood strands by pressing tapered elongated projections into the web as it is being consolidated so as to force said strands apart without cutting of the strands.

25. Process as claimed in claim 8, wherein a number of said webs are combined to form said matrix.

26. Process as claimed in claim 8, wherein a number of said matrices are combined to form said product, the directions of alignment of strands in adjacent said matrices being nonparallel.

* * * * *